United States Patent
Dambach

[15] 3,704,532
[45] Dec. 5, 1972

[54] CHART BOARD AND METHOD FOR DEMONSTRATING BAND FORMATIONS AND MANEUVERS

[72] Inventor: Richard W. Dambach, 618 N. Cherry Street, Kenton, Ohio 43326

[22] Filed: March 13, 1970

[21] Appl. No.: 19,479

Related U.S. Application Data

[63] Continuation of Ser. No. 715,219, March 22, 1968, abandoned.

[52] U.S. Cl. .................................. 35/29 R, 35/7 R
[51] Int. Cl. ........................................... G09b 1/10
[58] Field of Search ................... 35/7, 24.4, 27, 29

[56] References Cited

UNITED STATES PATENTS

| | | | |
|---|---|---|---|
| 2,412,238 | 12/1946 | Wassell | 35/24 UX |
| 2,545,409 | 3/1951 | McCall | 35/7 X |
| 2,579,105 | 12/1951 | Baldine | 35/29 |
| 2,933,316 | 4/1960 | Mancini | 35/29 UX |
| 3,139,687 | 7/1964 | Hamer | 35/29 X |
| 3,340,621 | 9/1967 | Snyder | 35/29 R |

FOREIGN PATENTS OR APPLICATIONS

549,234   4/1932   Germany.................................35/29

Primary Examiner—Harland S. Skogquist
Attorney—Fay, Sharpe and Mulholland

[57] ABSTRACT

A chart board for teaching marching band formations and maneuvers on a football field. The board has a planar surface inscribed with indicia simulating a football field. Openings are provided on the surface of said board to receive pegs representing the band members. The spacing between the openings is scaled and correlated to the indicia on the board to duplicate an average marching interval or step on the football field.

3 Claims, 2 Drawing Figures

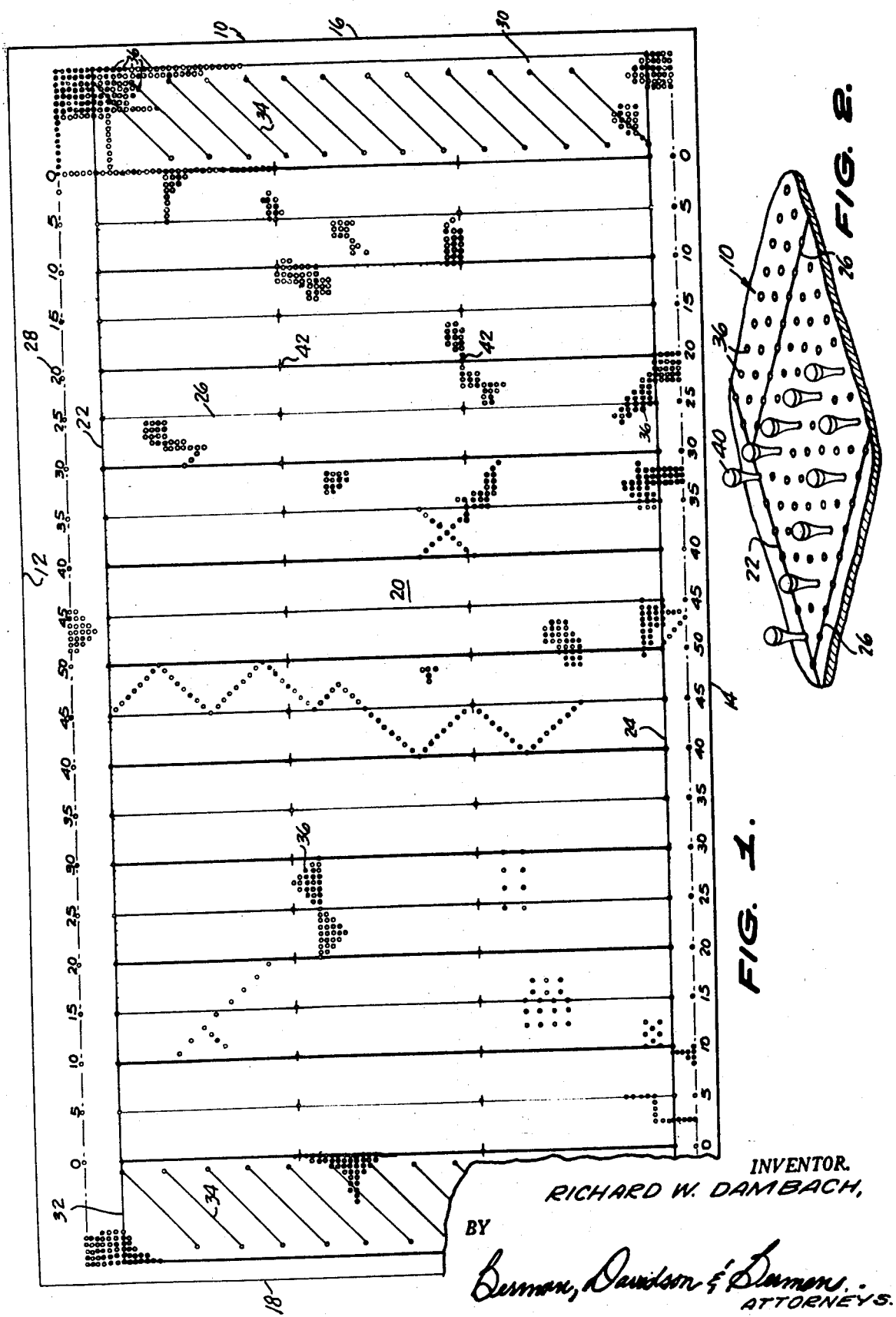

3,704,532

CHART BOARD AND METHOD FOR DEMONSTRATING BAND FORMATIONS AND MANEUVERS

REFERENCE TO RELATED APPLICATION

This application is a continuation of application Ser. No. 715,219, filed Mar. 22, 1968 and now abandoned.

BACKGROUND OF THE INVENTION

This invention relates to a teaching aid, and more particularly, to a charting board for use in planning and demonstrating band formations and maneuvers on a football field.

This invention has as its object the provision of a board inscribed with indicia simulating a football field, which is adapted to receive and retain a plurality of pegs to demonstrate the various positions of the members of a marching band prior to actual execution of a formation or maneuver.

A further object of this invention is to provide a teaching aid of the character indicated provided with openings to receive and retain a plurality of pegs representing the members of a marching band, the distance between said openings being scaled to equal an average marching interval or step on a football field.

A still further object of this invention is to provide a teaching aid which saves valuable teaching time in presenting football band maneuvers in sequence.

Further objects and advantages of the invention will become apparent from the following description and claims, and from the accompanying drawings, wherein:

FIG. 1 is a fragmentary top plan view of the charting board comprising the subject matter of the present invention; and FIG. 2 is a fragmentary perspective view of a section of the board shown in FIG. 1, with a plurality of pegs in position to demonstrate a band formation.

Referring now to the drawing in detail, wherein like numerals indicate like elements throughout the two views, FIG. 1 illustrates a charting board generally designated by the numeral 10.

Board 10 is substantially rectangular and is constructed from tempered masonite or the like, approximately one quarter inch thick. Board 10 includes opposed longitudinal edges 12 and 14, and relatively shorter opposed edges 16 and 18.

Board 10 has a planar surface 20 inscribed with indicia simulating a football field. For example, spaced, parallel lines 22 and 24, parallel to edges 12 and 14 of board 10 represent the side lines of the football field. Inscribed between lines 22 and 24, at equally spaced intervals, are lines 26, parallel to edges 16 and 18 of board 10. Lines 26 simulate the five yard interval markings on a football field, and are identified as such by numerals 28 inscribed on the board 10 between lines 22, 24 and the adjacent edges 12, 14 of board 10.

Inscribed rectangles 30 and 32 at each lateral end of board 10 simulate the end zones of the football field. Diagonal lines 34 within rectangles 30 and 32 enable the areas of board 10 simulating the end zones to be readily distinguished at a glance from the remaining areas on the board.

Arranged in parallel columns and rows on surface 20 of board 10 are a plurality of openings 36 extending through the board. The distance between openings 36 in each row and column is scaled to represent and equal an average marching step on a football field of 22 ½ inches. This would be equal to 8 steps for every 5 yards marched. Therefore, as shown in FIG. 2, a column of openings 36 is made to coincide with each line 26 representing a 5 yard interval on a football field. Between each line 26, there are seven openings 36 in each row of openings. Similarly, there would be the same number of openings 36 in each column at scaled 5 yard intervals along lines 26.

As shown in FIG. 1, openings 36 are also provided outside of the simulated football field playing area, or outside of lines 22, 24, and in the simulated end zones, to teach band maneuvers in approaching and exiting from the playing field.

A number of pegs 40, such as different colored golf tees are provided to simulate the members of a marching band. As shown in FIG. 2, pegs 40 are adapted to be positioned in selected ones of openings 36 in board 10 to demonstrate various band formations on the simulated football field. By the use of different colored pegs, a series of movements and their sequence can be demonstrated at the same time on board 10.

Additional indicia, such as two equally spaced, short lines 42, intersecting each line 26 at right angles, are also provided on surface 20. Lines 42 divide each line 26 into three equal parts and simulate the lines on a football field at which a football could be placed in play. Bands use these lines as guides in their marching formations.

Surface 20 of board 10 could be painted green to simulate the grass on the football field, and the various lines could be made from paint of a contrasting color so that they are plainly visible at a distance.

Board 10 could be hung vertically upon a wall by standard suction cups or hangers or could be used in a horizontal position.

While a specific embodiment of my invention has been disclosed in the foregoing description, it will be understood that various modifications within the spirit of the invention may occur to those skilled in the art. Therefore, it is intended that no limitations be placed on the invention except as defined by the scope of the appended claims.

I CLAIM:

1. As an article of manufacture, a teaching aid for use in planning and demonstrating band formations and manuevers on a football field, said teaching aid comprising a substantially planar board, indicia on one surface of said board including a plurality of parallel lines simulating the five yard interval markings on a football field, said board having a plurality of peg-receiving openings on said one surface arranged so as to define a plurality of equally spaced parallel columns and a plurality of equally spaced parallel rows with said columns being perpendicular to said rows, the spacing between adjacent columns being equal to the spacing between adjacent rows, adjacent openings in said columns and adjacent openings in said rows being equally spaced, a column coinciding with each of said parallel lines with seven columns disposed between adjacent parallel lines, whereby the distance between adjacent openings in any column and the distance between adjacent openings in any row is scaled to a 22 ½ inch marching step of a bandsman on a football field, and a plurality of pegs adapted to be positioned in selected ones of said openings.

2. A method of planning and demonstrating band formations and maneuvers on a football field comprising the steps of:

a. Providing a substantially planar board having indicia on one surface thereof including a plurality of parallel lines simulating the five yard interval markings on a football field, said board having a plurality of peg-receiving openings on said one surface arranged so as to define a plurality of equally spaced parallel columns and a plurality of equally spaced parallel rows with said columns being perpendicular to said rows, the spacing between adjacent columns being equal to the spacing between adjacent rows, adjacent openings in said columns and adjacent openings in said rows being equally spaced, a column coinciding with each of said parallel lines with seven columns disposed between adjacent parallel lines, whereby the distance between adjacent openings in any column and the distance between adjacent openings in any row is scaled to a 22 ½ inch marching step of a bandsman on a football field;

b. Providing a plurality of pegs each simulating a bandsman and adapted to be positioned in selected ones of said openings;

c. Inserting a first set of pegs into selected ones of said openings to simulate a first band formation;

d. Inserting at least one additional set of pegs into selected ones of said openings to simulate at least one additional band formation, whereby corresponding pegs of said first set and said additional set are separated by openings, such openings indicating both the direction of travel and the number of 22 ½ inch steps that a bandsman must take in progressing from a first band formation to an additional band formation.

3. The method of claim 2 in which method step (b) is further defined as the step of:

b'. providing a plurality of pegs each simulating a bandsman and adapted to be positioned in selected ones of said openings, said plurality of pegs including a first set of pegs colored with a first color and at least one additional set of pegs colored with at least one additional color.

* * * * *